J. C. WAHL.
CALCULATING MACHINE.
APPLICATION FILED AUG. 17, 1911.
1,062,309.
Patented May 20, 1913.
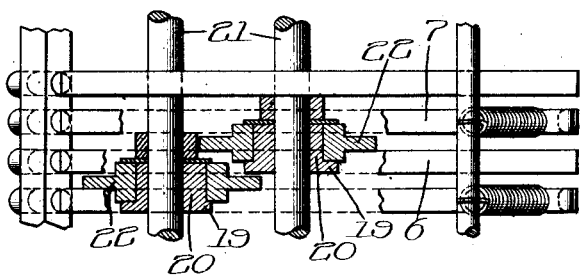
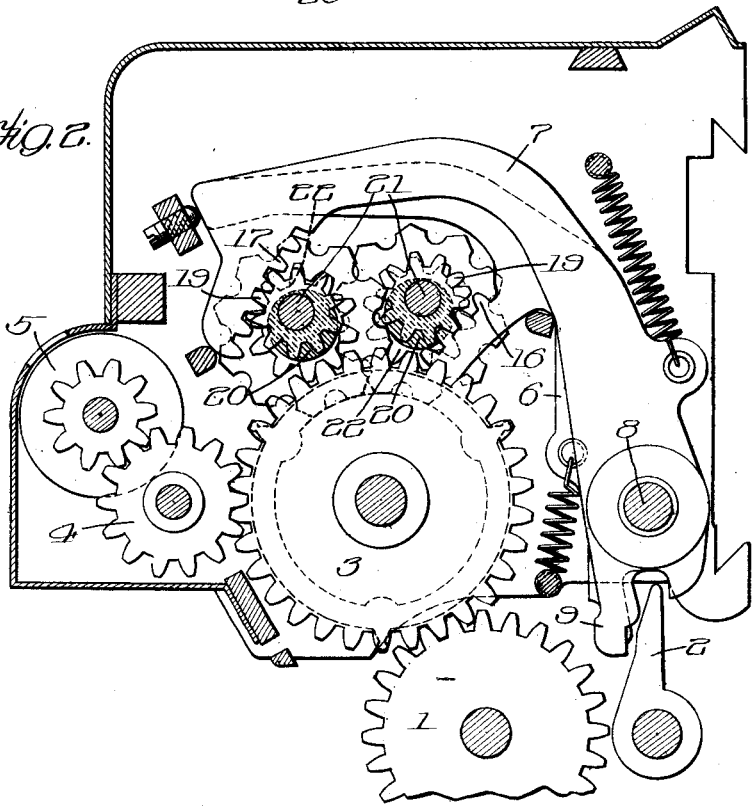
Witnesses:
Jno. H. Nelson Jr.
Edwin B. Wilson
Inventor:
John C. Wahl
By Hyman Eli Goldberg
Atty.

UNITED STATES PATENT OFFICE.

JOHN C. WAHL, OF CHICAGO, ILLINOIS, ASSIGNOR, BY MESNE ASSIGNMENTS, TO WAHL ADDING MACHINE COMPANY, OF WILMINGTON, DELAWARE, A CORPORATION OF DELAWARE.

CALCULATING-MACHINE.

1,062,309.   Specification of Letters Patent.   Patented May 20, 1913.

Application filed August 17, 1911. Serial No. 644,575.

*To all whom it may concern:*

Be it known that I, JOHN C. WAHL, a citizen of the United States, residing at Chicago, in the county of Cook and State of Illinois, have invented certain new and useful Improvements in Calculating-Machines, of which the following is a specification.

My invention is an improvement in totalizers such as is described in my Patent No. 893,719, issued to me July 21, 1908.

The invention is illustrated by the drawings, of which—

Figure 1 represents a sectional plan, and Fig. 2 a sectional elevation of the totalizer.

As described in the above cited patent, the totalizer forms part of a calculating attachment to a typewriter. It is driven by means of the numeral keys of the typewriter, upon whose operation the master mechanism of the attachment operates and drives the master wheel and master dog. The master wheel rotates the carrying wheels of the totalizer *seriatim*, while the master dog disconnects the carrying wheel just being operated on from the carrying wheels to the right thereof.

My invention is an improved method for disconnecting the carrying wheel operated on by the master wheel from the carrying wheels to the right.

In the drawings, 1 represents the master wheel and 2 the master dog, operated as mentioned above, and fully described in the above cited patent.

3 represents the carrying wheel, which carrying wheel is geared to the idle wheel 4 and drives the figure wheel 5.

6 and 7 represent arms which are mounted upon the shaft 8. These arms have their lower extremities 9 formed to coöperate with the master dog 2, which when operated moves its upper end forward (to the left as viewed in Fig. 2) and thereby rotates the arm which is opposite to it. The arm 6 has formed at its upper extremity a spur gear segment 16, and arm 7 an annular gear segment 17. Meshing with segment 16 is a gear 19, and with segment 17 is another gear 19. These gears 19 are each integrally formed with eccentrics 20, respectively, these eccentrics being mounted upon the shafts 21—21. It will thus be seen that the motion of the master dog 2 indirectly causes the rotation of the eccentrics 20 about the shafts. Mounted on each eccentric is a carried pinion 22 which is adapted to be used as a connection between one carrying wheel 3 and the next carrying wheel. It is evident that the carried pinion serves as a connection only when the eccentric brings it in its approached position toward the carrying gear 3, and that such connection is broken when the eccentric is rotated about its shaft to bring the carried pinion into its receded position away from the carrying gear.

Of course, it will be understood that there is an eccentric and connected gear and coöperating carried pinion for each carrying gear, and that all the mechanism is suitably supported in the framework of the totalizer. It will be further understood that there is present mechanism which prevents the carried pinions from being displaced from their proper locations when in their receded positions, but as this mechanism is not part of my invention, it will not be any further described.

Having thus described my invention, I claim:

1. In a calculating-machine totalizer, a series of carrying gears, a series of carried pinions, each carried pinion serving as a connection between a carrying gear and the next higher carrying gear of the series, a series of eccentrics upon which said carried pinions are mounted, and means for rotating the eccentrics.

2. In a calculating-machine totalizer, a series of carrying gears, a series of carried pinions, each carried pinion serving as a connection between a carrying gear and the next higher carrying gear of the series, a series of eccentrics upon which said carried pinions are mounted, and a series of gear sectors for operating said eccentrics.

3. In a calculating-machine totalizer, a series of carrying wheels, a series of carried pinions, each of the carried pinions serving as a connection between a carrying wheel and the next higher carrying wheel of the series, a series of eccentrics supporting the carried pinions, said eccentrics being distributed into two groups, a series of arms for operating said eccentrics, said arms being likewise distributed in two groups, each arm of one group being furnished with a spur gear sector while each arm of the other group is furnished with an annular gear sector, and a series of gears formed integrally with the eccentrics and meshing with the gears formed upon the arms, for the purpose described.

4. In a calculating-machine totalizer, a series of carrying gears, a series of carried pinions, each of said carried pinions being adapted to serve as a connection between a carrying gear and the next higher carrying gear of the series, a series of eccentrics upon which the carried pinions are mounted and by means of which they are approached to and receded from the carrying gears, said series of eccentrics being distributed in two groups, to thereby gain more room and to allow the strengthening of the parts.

5. In a calculating-machine totalizer, a series of carrying gears, a series of carried pinions, each of the carried pinions serving as a connection between a carrying gear and the next higher carrying gear of the series, a series of eccentrics mounted upon two shafts and spaced alternately upon said shafts, a series of gears rigidly attached to said eccentrics, the carried pinions being mounted upon the eccentrics, a means for rotating the eccentrics upon the shaft to thereby bring the carried pinions into mesh with their coöperating carrying gears and to withdraw the carried pinions away from their coöperating carrying gears, for the purpose described.

In witness whereof, I have hereunto subscribed my name in the presence of two witnesses.

JOHN C. WAHL.

Witnesses:
ALFRED M. RYCKOFF,
DAVID GOLDBERG.